May 8, 1951 J. L. DELVAUX 2,552,157

FREQUENCY MODULATED WAVE GENERATOR

Filed July 31, 1947

Inventor:
Jean L. Delvaux,
by Merton D. Morse
His Attorney.

Patented May 8, 1951 2,552,157

UNITED STATES PATENT OFFICE 2,552,157

FREQUENCY MODULATED WAVE GENERATOR

Jean L. Delvaux, Paris, France, assignor to General Electric Company, a corporation of New York Application July 31, 1947, Serial No. 764,952
In France October 23, 1943

Section 1, Public Law 690, August 8, 1946
Patent expires October 23, 1963

13 Claims. (Cl. 332—28)

This invention relates to a generator of frequency modulated waves, and more particularly to apparatus for frequency modulating a relatively high frequency wave through the use of a reactance tube.

An object of the invention is to provide a frequency modulation wave generator of improved linearity. A further object is to improve the effectiveness of reactance tube frequency modulators.

Another object of the invention is to provide a frequency modulating reactance tube circuit which will swing or sweep the frequency of a high frequency signal in a tuned tank circuit about a mean frequency which corresponds exactly, or substantially exactly, with the frequency to which the tank circuit is tuned.

An additional object is to provide an improved frequency modulating system comprising a reactance tube wherein the tube is so operated as to frequency modulate a high frequency wave while introducing a minimum of distortion, such as may be due to non-linear characteristics of the tube.

Another object of the invention is to provide a frequency modulated wave generator comprising a balanced modulator for providing a suppressed carrier wave with two sidebands in combination with a reactance tube wherein the reactance tube draws from an oscillator tank circuit leading quadrature current during one half cycle of the modulating voltage and lagging quadrature current during the next half cycle.

A further object is to provide an improved unitary generating system for frequency modulated waves comprising inverse feedback means to minimize distortion, a reactance tube for superimposing the modulation of the high frequency wave, and apparatus for furnishing a phase shifted high frequency signal of the type known as a suppressed carrier wave with two sidebands to the control electrode circuit of the reactance tube.

It is also an object of the invention to obviate the shift in mean oscillator frequency which arises in prior art reactance tube modulating systems as a result of change in characteristics of the reactance tube or of supply voltages, and to make unnecessary, accordingly, devices for manually or automatically adjusting the mean oscillator frequency to compensate for deviations of the mean frequency of the frequency modulated signal from the desired mean frequency.

Figure 2:
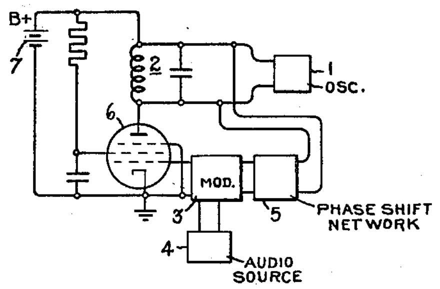
Figure 1:
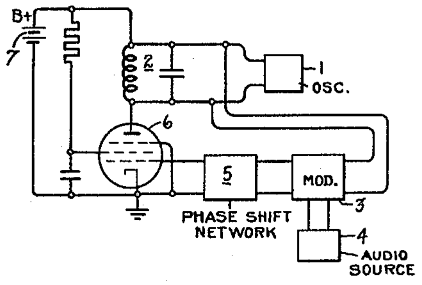

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 is a schematic diagram showing the general arrangement of component parts of a system for frequency modulation wave generation according to the invention; Fig. 2 is a similar diagram of a modified system; and Fig. 3 is a schematic diagram showing in greater detail a system of the general arrangement of that of Fig. 1, in accordance with a preferred embodiment of the invention.

As shown in Fig. 1, an oscillator 1, provided with a frequency determining tank circuit 2, is connected to furnish wave energy of preferably relatively high frequency, such as a radio frequency, to a balanced modulating device 3, which modulates the signals from oscillator 1 in accordance with the preferably relatively low frequency signals, such as audio signals, from a suitable source 4, which may include a microphone (not shown). The signals from the modulator 3 consist of suppressed carrier wave with two sidebands. The modulated signals developed in modulator 3 are supplied through a phase shifting network 5 to the control electrode of an electron discharge device 6, which operates as a reactance tube by conducting a current in quadrature, or nearly in quadrature, with the oscillator current in the tank 2. Discharge device 6, the reactance tube, is shown as a pentode tube, the screen grid and anode of which are energized from a suitable source of B+ potential, such as the battery 7, and with the suppressor grid grounded. The frequency modulated output signals may be derived from the reactance tube anode circuit or from the tank circuit in any suitable manner.

In the modification of the system shown in Fig. 2, the phase shift network 5 is interposed between the oscillator 1 and the balanced modulator 3 to shift the phase of the high frequency signals prior to, rather than after, the modulation thereof. The signal applied to the control electrode of the reactance tube 6 is thus phase shifted and modulated in such a way as to provide substantially the same type of signal to the control electrode as occurs in the system of Fig. 1.

Figure 3:
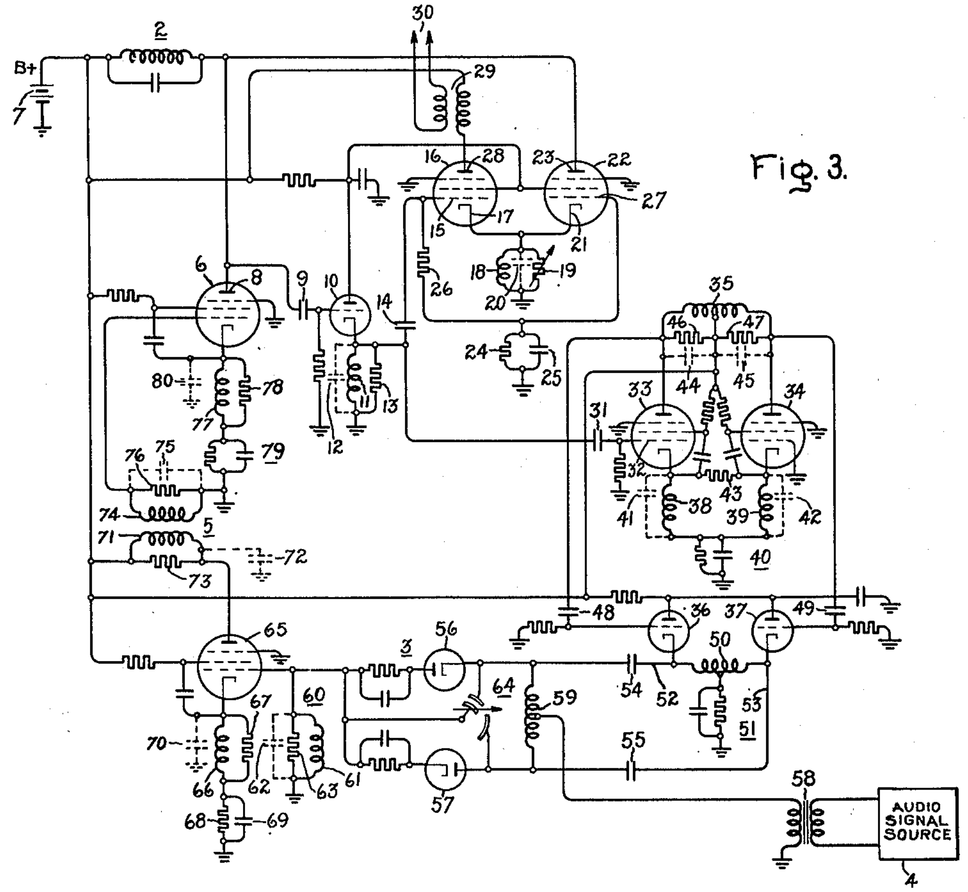

In the system shown in detail in Fig. 3, an oscillator for generating high frequency energy is provided comprising electron discharge devices 10, 16 and 22, and a tuned tank circuit 2. One terminal of the tank circuit is connected to a suitable source, represented by a battery 7, for furnishing B+ operating potentials. The other terminal of the tank circuit is connected to the anode 8 of discharge device 6, which operates as a reactance tube, as well as through a capacitor 9 to the control electrode of a discharge device 10, which may be a triode electron tube, arranged in a cathode follower circuit to provide a voltage across an inductance 11 which very nearly equals the voltage applied to the control electrode. The inductance 11 is tuned to the frequency of the oscillator by the stray or inherent capacitance of the circuit including the interelectrode capacitance existing in device 10 between its cathode and ground, this inherent capacitance being represented in Fig. 3 by a capacitor 12 in dotted lines. Additional capacitance may be added, of course, by providing a capacitor element, if necessary. A damping resistor 13 is connected in shunt to the inductance 11 to broaden the frequency response characteristics of the tuned circuit in a known manner. Signals generated on the cathode of device 10 are impressed, through capacitor 14, on the control electrode 15 of electron discharge device 16 so as to cause the cathode 17 to follow closely the voltage on control electrode 15. Cathode 17 is grounded through a broadly tuned network comprising inductance 18, resistor 19 and the inherent circuit and interelectrode capacitance represented in dotted lines as a capacitor 20. This network provides a substantially constant resistive impedance throughout a band of frequencies centered upon the mean high frequency of the oscillator. Directly connected to cathode 17 is the cathode 21 of electron discharge device 22, having an anode 23 connected directly to the last mentioned terminal of tank circuit 2. The control electrodes of devices 16 and 22 are biased in accordance with the control electrode current drawn through leakage resistor 24 which develops a potential on capacitor 25. A blocking resistor 26 substantially prevents the application of signals appearing on control electrode 15 of device 16 to the control electrode 27 of device 22. It will be found that device 22 provides energy to the tank circuit 2 in the proper phase to sustain oscillations in the tank circuit. The anode 28 of device 16 is connected to the source of operating potential through the primary of a transformer 29, whereby an output signal is provided from the secondary through leads 30 which may be connected to any desired utilization device. The output signal as later described will be frequency modulated high frequency signals.

The high frequency signals generated on the cathode of device 10, in addition to being supplied to devices 16 and 22, is furnished through capacitor 31 to the control electrode 32 of discharge device 33 which forms, together with another discharge device 34, a symmetrical amplifier of a known type. The amplifier comprising these two discharge devices serves to furnish a signal across the terminals of center tapped inductance 35 to the control electrodes of two symmetrically arranged discharge devices 36 and 37, respectively.

The signals provided through condenser 31 cause conduction in device 33 which is out of phase with the conduction in device 34. The cathodes of these devices are returned to ground through separate tuned networks comprising inductances 38 and 39 respectively, and through a common resistance-capacitor network 40 for providing cathode self-bias for the discharge devices. The inductances 38 and 39 are broadly tuned to the operating high frequency by the inherent capacitances 41 and 42, respectively, existing between the cathodes and ground. A resistor 43 is arranged to connect the cathode and to provide degenerative action at the operating frequency. Since the circuits comprising inductance 38 and capacitance 41, and inductance 39 and capacitance 42, respectively, offer a high impedance at the operating frequency, a substantial part of the cathode current of each discharge device while conducting must be drawn through resistor 43. The anodes of devices 33 and 34 are connected to opposite terminals of inductance 35, to the center tap of which B+ operating potential is provided. The inherent capacity associated with the anode circuit of each of the discharge devices, indicated as capacitors 44 and 45 in dotted lines, serves to tune the respective half of the inductance 35 to the operating frequency, and damping resistors 46 and 47 are arranged to broaden the response characteristics.

The voltages developed on the extreme terminals of inductance 35 are provided, as mentioned, to the control electrodes of symmetrically arranged discharge devices 36 and 37, respectively, through coupling capacitors 48 and 49. The cathodes of devices 36 and 37 are connected to opposite terminals of a high frequency choke comprising 50, the center tap of which is grounded through a suitable resistance-capacity self-biasing network 51. Devices 36 and 37 accordingly develop signals on conductors 52 and 53, respectively, which are equal in magnitude but opposite in phase. These signals are applied through capacitors 54 and 55 respectively to oppositely connected diodes 56 and 57 respectively, which comprise, with their associated circuits, balanced modulating system. To the signals of radio or high frequency thus furnished to the diodes are added modulating voltages, such as audio voltages, from a signal source 4 and coupling transformer 58. The transformer secondary provides alternating voltages at the modulating voltage frequency to the center tap of a high frequency choke coil 59 connected directly across the diode input connections from capacitors 54, 55. Coil 59 prevents loss of high frequency energy to the transformer 58.

It will be understood that the term balanced modulator as used herein refers to a device or circuit capable of producing from a high or radio frequency signal and a low or audio frequency signal, a modulated high frequency signal of the type known as a suppressed carrier wave with two sidebands. The modulator described herein embodies principles set forth in British Patent No. 469,472, application date: October 24, 1935, to Frederic Calland Williams, which shows several arrangements for providing a modulated signal of the type used in the present invention.

When there is no voltage on the secondary of transformer 58, the two diodes 56, 57 conduct current impulses which are equal and of opposite sign and which equalize each other in a filter circuit 60. This filter comprises an inductance 61, broadly tuned by the inherent circuit capacitance, represented by capacitor 62 in dotted lines, to the mean oscillator frequency, the response characteristics being extended by the addition of shunt resistance 63 to include the band of high frequencies generated by the oscillator. The appearance of a low frequency modulating voltage, during a negative half cycle thereof, for instance, causes one of the diodes, such as diode 56 to have a larger output, and the other diode a lower output, providing a series of high frequency negative pulses across load circuit 60, each pulse being equal to the difference between the two pulses respectively supplied by the two diodes since these pulses are of opposed polarity and occur simultaneously. During the ensuing half cycle of the modulating voltage, the output of diode 57 is larger than that of diode 56 and a series of positive high frequency pulses appears across load impedance circuit 60. It will be seen that the diodes operate as peak detectors, and that the signal supplied by the oppositely connected pair comprises a series of varying intensity high frequency pulses of which the polarity reverses with each half cycle of the modulating voltage. The pulses supplied by the diodes will contain an audio or low frequency component, but this component is removed by the filter 60, and the filter also serves to shape the series of pulses into sine waves. The resulting signal across filter 60 comprises what is herein called a suppressed carrier wave with two sidebands and comprises envelopes of the high frequency recurring at twice the frequency of the modulating voltage, the high frequency waves in adjacent envelopes being reversed in phase since the high frequency waves are derived without substantial phase shift by combining pulses which occur simultaneously but which combine to provide net positive pulses during one half of a modulating voltage cycle and net negative pulses during the next half cycle.

Also appearing across filter or load circuit 60 will be a constant amplitude high frequency signal in phase quadrature to the above mentioned high frequency pulses. This constant amplitude signal is furnished through a variable condenser 64 comprising a pair of symmetrically arranged stator plates connected respectively to capacitors 54 and 55 and a movable or rotor plate arranged for varying the amount of coupling in inverse relationship from each of the respective stator plates. The rotor plate may be adjusted to provide a signal which is leading the positive pulses by 90 degrees, or when the coupling to the other stator plate is increased, lagging the positive pulses by 90 degrees. By providing equal coupling, the high frequency signal will balance out in the condenser and no constant amplitude signal will be furnished therethrough. The purpose of adding high frequency signal through condenser 64 will be later discussed.

The modulated signal appearing across load circuit 60 is applied to the control electrode of an electron discharge device 65, which has an anode and a cathode, and if desired, a screen grid and suppressor grid as shown. The cathode of device 65 is connected to ground through a broadly tuned circuit comprising an inductance 66 by-passed by damping resistor 67, and through a series connected self-biasing resistor 68 in parallel with a capacitor 69. The interelectrode and inherent circuit capacitance, represented by capacitor 70 in dotted lines, serves to tune the inductance to the mean high frequency. The impedance of the tuned circuit provides a desirable amount of degeneration at the high frequency.

The anode circuit for the device comprises the primary winding 71 of a transformer serially connected to the B+ power supply. This winding is tuned by the inherent capacitance represented by capacitor 72 shown in dotted lines to the mean high frequency, the tuning being broadened by damping resistor 73 in parallel with the winding. The secondary winding 74, similarly broadly tuned by inherent capacitance 75 shown in dotted lines and parallel damping resistor 76, is arranged to provide to the control electrode of discharge device 6 the sine waves of varying intensity and reversing phase produced in the anode circuit of device 65, this signal being an amplified replica of the signal appearing across tuned circuit 60. The transformer is arranged to shift the phase of the signal by 90 degrees, or as nearly 90 degrees as possible, and while a transformer is shown, other types of phase shift networks, of course, may be employed, if desired.

It is important in the avoidance of parasitic amplitude modulation by the reactance tube that the control electrode voltage be exactly in quadrature with the oscillator tank voltage. While with suitable design it is possible to approach this condition by the phase shift in transformer 71, 74, it may prove desirable to so proportion the degenerative impedance networks, including inductances 38 and 39, and inductance 66, or the load impedance network comprising inductance 35, or the impedance network 60, that a slight phase shift is introduced to compensate for any phase shift that may be inherent in the circuit or for the departure from a 90 degree phase shift by the transformer 71, 74. It is well known, for instance, that by increasing the capacitance in the cathode circuit, while decreasing the inductance to preserve the frequency of the tuning, phase shift due to an inductive anode load impedance may be compensated. For this purpose, it may be necessary to add a capacitance element to the inherent capacitance shown. Such other phase correcting circuits or procedures may be employed, of course, as are best suited to the particular application.

The constant amplitude high frequency signal derived from variable condenser 64 is, like the signal from the diodes, amplified in device 65 and shifted in phase by substantially 90 degrees in the transformer 71, 74 and applied to the control electrode of discharge device 6.

In operation, device 6 acts as a reactance tube because the suppressed carrier wave with two sidebands will be substantially 90 degrees out of phase with the voltage appearing across tank circuit 2. The current drawn by device 6 will be capacitive or leading during one half of a cycle of the modulating voltage and will be inductive or lagging for the next half cycle since the high frequency waves in adjacent half cycle envelopes are of opposite phase as heretofore explained.

To summarize the operation of the modulating system, the high frequency signal of tank circuit 2 is applied to the control electrode of device 10, yielding an in-phase signal which is applied to the control electrode of device 33. The two discharge devices 33, 34 produce a signal across inductance 35 which it will be found is 180 degrees out of phase with the original signal on the control electrode of discharge device 36 and in-phase on the control electrode of discharge device 37. The signals are next supplied without further phase shift to the diodes 56 and 57, respectively. In the absence of modulating voltages from transformer 58, both diodes will conduct simultaneously but in opposite polarities to provide equal but opposite polarity pulses simultaneously to the output circuit. A modulating voltage causes, during successive half cycles, a first series of pulses of positive polarity, in what may be termed a half cycle envelope, and then a series of negative polarity 180 degrees out of phase with the original signal. The phase is reversed in device 65 and is then shifted by 90 degrees in the transformer 71, 74. The high frequency variable amplitude waves applied to the control electrode of device 6 are of alternately positive and negative polarity with successive half cycles of the modulating voltage, and are alternately leading and lagging the original signal with successive half cycles of the modulating voltage. For one half cycle of modulating voltage, accordingly, device 6 draws a leading current at the oscillator frequency, and for the next half cycle a lagging current at the oscillator frequency. The variation in intensity of the current drawn during each half cycle, it will be understood, depends upon the variation in intensity of the modulating voltage.

The quadrature current drawn by device 6 serves to alter the frequency of the oscillating tank circuit, raising or lowering the frequency in accordance with whether the current is lagging or leading. Unlike prior art reactance tube modulators, the reactance tube draws leading current through one half cycle and lagging current through the next half cycle of modulating voltage. In prior art reactance tube modulators, a change in tube characteristics of the reactance tube, due to aging or voltage changes or the like, will change the average or mean value of the reactance presented by the tube and hence will change the mean frequency of the high frequency oscillations. In the system, herein disclosed, however, a change in characteristics will have no substantial effect on the mean of the high frequency.

The constant amplitude high frequency signal from condenser 64 is shifted in phase by the condenser by substantially 90 degrees since filter 69 is substantially resistive throughout the sweep of high frequency, and depending on which of the stator plates it is drawn from, it may be either lagging or leading with respect to the signal in tank circuit 2. The constant amplitude signal is reversed in phase in device 65 and again shifted 90 degrees in transformer 71, 74 to be applied to the control electrode of device 6 in either aiding or opposing relation to the original signal. The feedback thus established may be made to buck or boost the oscillator frequency to a readily variable degree by proper adjustment of the position of the rotor plate of condenser 64 with respect to the two stator plates. It may be desired to simplify the system shown by eliminating discharge devices 16 and 22 and using the feedback signal from the condenser 64 to maintain oscillations in tank circuit 2.

Reactance tube 6 is provided with a degenerative network in the cathode circuit which comprises an inductance 77, by-passed by a damping resistor 78, and in series with a resistor-capacitor network 79, which provides self-biasing potentials. The inherent capacitance 80, indicated in dotted lines, serves to tune with the inductance to the mean high frequency. Compensating phase shift may be accomplished in this circuit in the same manner as suggested above for the cathode circuit of device 65.

It will be understood that suitably excited heaters for the cathodes of the several discharge devices should be provided, and that where multiple grid devices are shown that operating potentials are furnished through resistance capacity networks as shown. Well known types of connections for providing anode operating potentials to the discharge devices are shown in Fig. 3 but have not been specifically described, and suitable leak resistances for the control electrodes of several discharge devices may be applied as required such as those shown in this Fig. 3. Many of the tuned circuits are shown as comprising an inductance shunted by a damping resistance and by inherent capacitance of the circuit, including interelectrode capacitances. These circuits are conveniently tuned in this manner to the mean high frequency of the oscillator voltage so as to provide a substantially constant resistive impedance throughout the band of frequencies swept by the frequency modulated signal. It may be desired to provide capacitance elements, which may or may not be adjustable, in those locations at which the inherent capacitances are indicated in dotted lines in Fig. 3.

I have, accordingly, shown in detail in Fig. 3 a system of the general type of Fig. 1, wherein the 90 degree phase shift is applied to the amplitude modulated wave. It will be apparent that a phase shift of 90 degrees may be applied to signals derived from the oscillator prior to modulation thereof, as shown in Fig. 2, without departing from the invention. In such modification, a transformer similar to transformer 71, 74, or another type of phase shifting device, could be provided in place of inductance 59 and the output of device 65 applied without further phase shift to the control electrode of reactance tube 6.

While I have shown only certain preferred embodiments of my invention by way of illustration, many modifications will occur to those skilled in the art and I therefore wish to have it understood that I intend, in the appended claims, to cover all such modifications as fall within the true spirit and scope of my invention.

What I claim as new and desire to secure by Letters Patent of the United States is:

1. In a frequency modulation generator, an oscillator comprising a frequency determining circuit tank circuit, a source of modulating voltage, means for extracting oscillations from said tank circuit phase shifting and amplitude modulating means for combining said modulating voltage and said oscillations to provide modulation containing sidebands phase displaced substantially 90 electrical degrees with respect to said oscillations, and means for combining said sidebands with said oscillations to control the frequency of said oscillator.

2. In a frequency modulation generator, an oscillator tank circuit, a reactance tube associated with said circuit, a source of modulating voltage, a balanced modulator for modulating the high frequency voltage appearing in said circuit to provide a signal comprising a suppressed carrier wave with two sidebands, means for shifting the phase of said signal by substantially 90 degrees, and means for applying said phase shifted signal to a control electrode of said reactance tube.

3. A frequency modulator comprising a high frequency signal generator for providing signals of substantially constant amplitude, balanced modulating means for amplitude modulating said signals, means for shifting the phase of said modulated signals to be substantially in phase quadrature with said generator signals, and variable reactance means controlled by said phase shifted modulated signals coupled to said generator for frequency modulating said high frequency signals.

4. A frequency modulator comprising a radio frequency signal oscillator including a reactance tube associated with the frequency determining means of said oscillator, balanced modulating means for modulating the signal generated by said oscillator, means for shifting the phase of said modulated signal by substantially 90 degrees and for applying said phase shifted signal to a control electrode of said reactance tube, whereby the frequency of said radio frequency signals is modulated in accordance with a modulation component of said modulated signal.

5. In combination, in a frequency modulation system with an oscillator tank circuit, a source of modulating voltage, a balanced modulator connected to receive high frequency energy from said circuit and modulating voltage from said source to provide a signal comprising a suppressed carrier wave with two sidebands, a reactance tube associated with said oscillator arranged to draw current therefrom, means to cause a quadrature phase shift between said energy and the high frequency components of said signal, and means to apply said signal to said reactance tube to modulate the frequency of said energy about the natural frequency of said circuit.

6. The method of frequency modulating the oscillatory energy in a tuned oscillator circuit comprising the steps of extracting a radio frequency voltage from said circuit, combining said extracted voltage with a modulating voltage to obtain a suppressed carrier wave with two sidebands, shifting the phase of said suppressed carrier wave with two sidebands into substantially quadrature relationship with said energy, and combining said phase shifted suppressed carrier wave with two sidebands with the radio frequency voltage in said circuit, whereby said energy is frequency modulated about a mean frequency which corresponds substantially with the frequency to which said circuit is tuned.

7. In a frequency modulation generator with a tuned frequency-determining oscillator, a reactance tube circuit which comprises a balanced modulator; means for applying a voltage related to the voltage appearing in said tuned circuit to said modulator and means for applying a modulation voltage to said modulator, the output of said modulator being coupled to said tuned circuit through the reactance tube in said circuit, and phase shifting means interposed in said circuit arranged to so shift the phase of voltages therein that the suppressed carrier wave with two sidebands developed in said modulator alternately leads and lags the tuned circuit voltage by substantially 90 degrees in accord with alternations in said modulation voltage.

8. A frequency modulation generator comprising a tuned frequency-determining circuit, means for sustaining oscillations in said circuit, a balanced modulator, means for applying an oscillating voltage from said circuit to said modulator and means for applying a modulation voltage to said modulator to produce a suppressed carrier wave with two sidebands, a reactance tube with a control electrode arranged for excitation by said suppressed carrier wave with two sidebands, and phase shift means interposed in the circuit containing said modulator between said tuned circuit and said control electrode to cause said suppressed carrier wave with two sidebands to assume a quadrature phase relationship alternately leading and lagging the oscillating voltage of said tuned circuit.

9. A frequency modulator comprising a radio frequency signal oscillator including a reactance tube associated with the frequency determining means of said oscillator, means for shifting the phase of said oscillator, balanced modulating means for modulating the phase shifted signal from said oscillator, whereby a suppressed carrier wave with two sidebands is produced which is substantially in phase quadrature with the oscillator signal, and means for applying said produced signal to a control electrode of said tube.

10. In a frequency modulator for an oscillator having a frequency determining circuit, amplitude modulating means receiving energy from said oscillator and from a source of modulating voltages for providing a suppressed carrier wave with two sidebands corresponding to the respective frequencies of said energy, said means comprising phase shift means whereby a carrier frequency component of said suppressed carrier wave with two side bands is shifted in phase to be substantially in quadrature with the energy in said circuit, and means for adding in said frequency determining circuit of said oscillator, currents corresponding to said suppressed carrier wave with two sidebands to the currents produced in said oscillator.

11. In a frequency modulator for an oscillator having a frequency determining circuit, amplitude modulating means receiving energy from said oscillator and from a source of modulating voltages for providing a suppressed carrier wave with two sidebands corresponding to the respective frequencies of said energy, said means comprising phase shift means whereby a carrier frequency component of said suppressed carrier wave with two sidebands is shifted in phase to be substantially in quadrature with the energy in said circuit, a reactance tube arranged to draw current from said circuit in accord with signals applied to a control electrode thereof, and means to apply said suppressed carrier wave with two sidebands to said control electrode.

12. A frequency modulation arrangement for an oscillator comprising a frequency determining circuit, including means for extracting carrier waves from said circuit, a source of modulating waves, means for amplitude modulating said carrier waves with said modulating waves to derive sidebands having a phase which is reversed at the modulating wave rate and which is displaced substantially 90 electrical degrees with respect to said carrier waves, and means for combining said modulated carrier waves with said carrier waves to control the frequency of said oscillator.

13. An arrangement according to claim 12 wherein said means for combining comprises an electron discharge device having an input and an output circuit, a source of direct potential, said device having its output circuit coupled through said frequency determining circuit to said potential, and means for applying said modulated carrier waves to said input circuit.

JEAN L. DELVAUX.

REFERENCES CITED

The following references are of record in the file of this patent:

UNITED STATES PATENTS

| Number | Name | Date |
|---|---|---|
| 1,747,160 | Carpe | Feb. 18, 1930 |
| 2,279,659 | Crosby | Apr. 14, 1942 |
| 2,296,962 | Tunick | Sept. 29, 1942 |
| 2,347,398 | Crosby | Apr. 25, 1944 |
| 2,400,648 | Korman | May 21, 1946 |